United States Patent
Min et al.

(10) Patent No.: US 8,603,931 B2
(45) Date of Patent: Dec. 10, 2013

(54) METHOD OF PREPARING CATALYST FOR FUEL CELL

(75) Inventors: Myoung-Ki Min, Suwon-si (KR); Geun-Seok Chai, Suwon-si (KR); Soon-Ki Kang, Suwon-si (KR)

(73) Assignees: Samsung SDI Co., Ltd., Giheung-gu, Yongin-si, Gyeonggi-do (KR); Korea Atomic Energy Research Institute, Deokjin-Dong, Yuseong-Gu, Daejeon-Si (KR)

( * ) Notice: Subject to any disclaimer, the term of this patent is extended or adjusted under 35 U.S.C. 154(b) by 0 days.

(21) Appl. No.: 11/980,764

(22) Filed: Oct. 31, 2007

(65) Prior Publication Data

US 2013/0288882 A1    Oct. 31, 2013

(30) Foreign Application Priority Data

Oct. 31, 2006   (KR) .................. 10-2006-0106684

(51) Int. Cl.
| | |
|---|---|
| B01J 37/34 | (2006.01) |
| B01J 23/00 | (2006.01) |
| B01J 23/42 | (2006.01) |
| B01J 23/44 | (2006.01) |
| B01J 19/08 | (2006.01) |
| B29B 9/00 | (2006.01) |
| H01J 37/30 | (2006.01) |

(52) U.S. Cl.
USPC ............... 502/5; 502/312; 502/313; 502/339; 264/10; 264/485; 204/157.44

(58) Field of Classification Search
USPC ............. 502/5, 312, 313, 339; 264/10, 485; 204/157.44
See application file for complete search history.

(56) References Cited

U.S. PATENT DOCUMENTS

| | | | | |
|---|---|---|---|---|
| 3,189,561 | A * | 6/1965 | Graham | 502/5 |
| 4,745,094 | A * | 5/1988 | Belloni Cofler et al. | 502/5 |
| 5,246,792 | A | 9/1993 | Watanabe | |
| 7,833,925 | B2 * | 11/2010 | Min et al. | 502/5 |
| 7,879,748 | B2 * | 2/2011 | Marti et al. | 502/5 |
| 8,324,127 | B2 * | 12/2012 | Uchikawa et al. | 502/326 |
| 2005/0112435 | A1 | 5/2005 | Kobayashi et al. | |
| 2005/0181285 | A1 | 8/2005 | Sakamoto et al. | |
| 2008/0096093 | A1 * | 4/2008 | Jang et al. | 429/42 |
| 2010/0248297 | A1 * | 9/2010 | Hwu et al. | 435/34 |

FOREIGN PATENT DOCUMENTS

WO      2004/022209      3/2004

OTHER PUBLICATIONS

Korean Notice of Allowance issued on Jun. 28, 2013 by KIPO in connection with Korean Patent Application No. 10-2006-0106684 and Request for Entry of the Accompanying Office Action attached herewith.

* cited by examiner

Primary Examiner — Patricia L Hailey
(74) Attorney, Agent, or Firm — Robert E. Bushnell, Esq.

(57) ABSTRACT

A method of preparing a fuel cell catalyst includes preparing a catalyst precursor solution by mixing a catalyst precursor and a solvent, and subjecting the catalyst precursor solution to radiation of electron beams having energy of less than or equal to 1 MeV. A method of preparing the fuel cell catalyst uses electron beams having low energy so that it can provide a desirable catalyst uniformly in a simple and economical process, as well as releasing few X-rays so that the catalyst can be mass produced.

20 Claims, 4 Drawing Sheets

METHOD OF PREPARING CATALYST FOR FUEL CELL

CROSS-REFERENCE TO RELATED APPLICATION AND CLAIM OF PRIORITY

This application claims priority to and the benefit of Korean Patent Application No. 10-2006-0106684 filed in the Korean Intellectual Property Office on Oct. 31, 2006, the entire content of which is incorporated herein by reference.

BACKGROUND OF THE INVENTION (a) Field of the Invention

The present invention relates to a method of preparing a fuel cell catalyst. More particularly, the present invention relates to a method of preparing a fuel cell catalyst in a simple process and on a large scale.

(b) Description of the Related Art

A fuel cell is a power generation system for producing electrical energy through an electrochemical redox reaction of an oxidant and hydrogen in a hydrocarbon-based material such as methanol, ethanol, or natural gas.

Such a fuel cell is a clean energy source that can replace fossil fuels. It includes a stack composed of unit cells, and produces various ranges of power output. Since it has a four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte membrane fuel cell has an advantage of a high energy density, but it also has problems in the need to carefully handle hydrogen gas and the requirement of accessory facilities such as a fuel reforming processor for reforming methane or methanol, natural gas, and the like in order to produce hydrogen as the fuel gas.

On the contrary, a direct oxidation fuel cell has a lower energy density than that of the polymer electrolyte fuel cell, but it has the advantages of easy handling of a fuel, being capable of operating at room temperature due to its low operation temperature, and no need for additional fuel reforming processors.

In the above fuel cell, the stack that generates electricity substantially includes several to scores of unit cells stacked in multiple layers, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to the anode and adsorbed on catalysts of the anode, and the fuel is oxidized to produce protons and electrons. The electrons are transferred into the cathode via an external circuit, and the protons are transferred into the cathode through the polymer electrolyte membrane. In addition, an oxidant is supplied to the cathode, and then the oxidant, protons, and electrons are reacted on catalysts of the cathode to produce electricity along with water.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides a method of mass-producing a fuel cell catalyst in a simple process.

According to an embodiment of the present invention, provided is a method of preparing a fuel cell catalyst that includes preparing a catalyst precursor solution by mixing a catalyst precursor and a solvent, and subjecting the catalyst precursor solution to electron beam radiation having energy of less than or equal to 1 MeV. In one embodiment, the electron beams have energy of 50 to 700 KeV, and in another embodiment, the electron beams have energy of 100 to 300 KeV.

In one embodiment, the electron beam irradiation is carried out with a dose rate ranging from 1 to 40 kGy/min, and in another embodiment, the electron beam irradiation is carried out with a dose rate ranging from 1 to 30 kGy/min.

The solvent may be a mixed solvent of water and alcohol. In one embodiment, the solvent may be a mixed solvent of water and polyhydric alcohol. The water and alcohol may be mixed in a volume ratio of 995 to 250:5 to 750, and in one embodiment, the water and alcohol may be mixed in a volume ratio of 970 to 500:30 to 500.

The alcohol may be selected from the group consisting of isopropyl alcohol, methanol, ethanol, n-propyl alcohol, butanol, ethylene glycol, glycerol, and combinations thereof.

The catalyst precursor solution includes 30 mM to 1 mM of a catalyst precursor, and in one embodiment, the catalyst precursor solution includes 20 mM to 5 mM of a catalyst precursor.

During the above mixing process, a carrier may be further added, or a dispersing agent may be further added.

The dispersing agent may be selected from the group consisting of tetrahydrofuran, glycerol, ethylene glycol, and combinations thereof.

The catalyst precursor may be selected from the group consisting of $H_2PtCl_6$, $H_6Cl_2N_2Pt$, $PtCl_2$, $PtBr_2$, platinum acetylacetonate, $K_2[PtCl_4]$, $H_2Pt(OH)_6$, $Pt(NO_3)_2$, $[Pt(NH_3)_4]Cl_2$, $[Pt(NH_3)_4](HCO_3)_2$, $[Pt(NH_3)_4](OAc)_2$, $(NH_4)_2PtBr_6$, $(NH_3)_2PtCl_6$, hydrates thereof, and combinations thereof.

According to an embodiment of the present invention, a method of preparing a fuel cell catalyst includes preparing a catalyst precursor solution by mixing a metal precursor and a solvent comprising water and alcohol; and subjecting the catalyst precursor solution to radiation of electron beams.

According to an embodiment of the present invention, a method of preparing a fuel cell catalyst includes preparing a catalyst precursor solution by mixing a first catalyst precursor having a platinum element, a second catalyst precursor including a transition element, and a solvent comprising water and alcohol mixed in a volume ratio of 995 to 250:5 to 750; and subjecting the catalyst precursor solution to radiation of electron beams having energy of less than or equal to 1 MeV.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
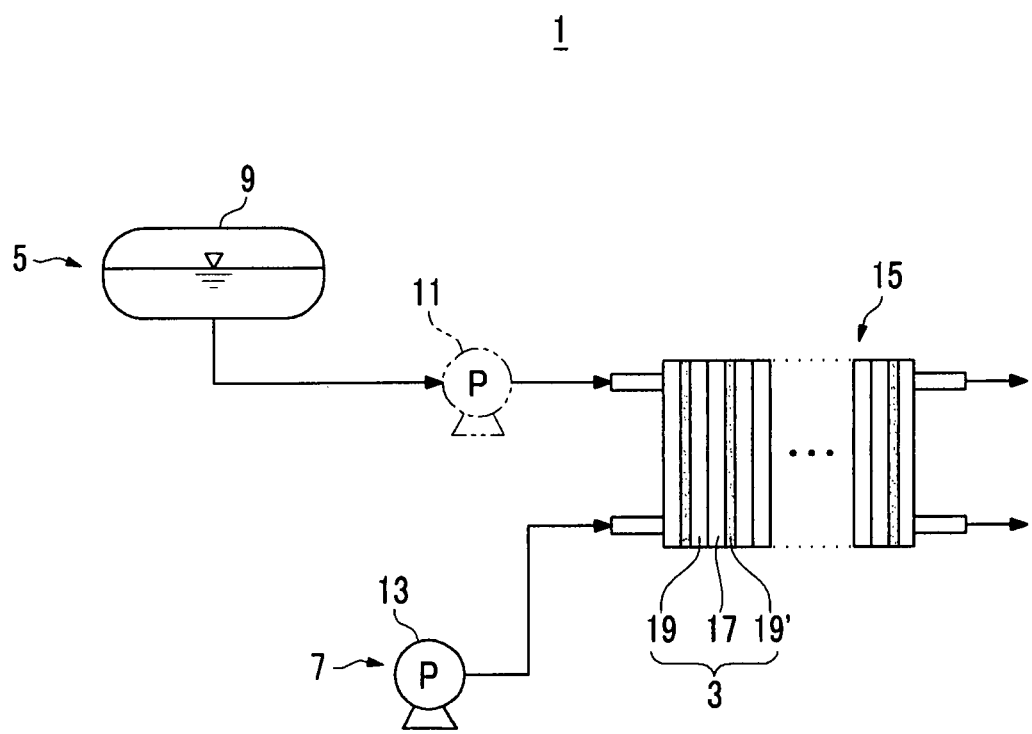
FIG. 1 schematically shows the structure of a fuel cell system according to one embodiment of the present invention.

The present invention relates to a method of mass producing a fuel cell catalyst in a simple process. Conventional methods of producing a fuel cell catalyst include a chemical method and an irradiation method. The chemical method reduces a catalyst precursor by a reducing agent such as $NaBH_4$, hydrazine, ethylene glycol, $H_2SO_3$, $LiAlH_4$, and so on, which is the most popular method, but the method cannot be applied to mass production due to the delicate process conditions optimized by many variables, such as reaction temperature, pH, and a speed (duration).

On the other hand, the irradiation method uses light rays instead of a reducing agent. The light source includes γ-rays, electron beams, and UV rays. The γ-rays and the electron beams are generally used, but since the electron beams need high energy of 2 to 10 MeV, the manufacturing device using the electron beams requires a large space, and thereby the cost is increased and the catalyst is hard to be mass produced. In addition, such high energy releases a lot of X-rays that are environmentally restricted, and so it is difficult to practically apply to the industry.

The present invention is provided to solve the problem and to provide a method of preparing a fuel cell catalyst. The process of the method includes mixing a catalyst precursor with a solvent to provide a catalyst precursor solution. The solvent includes a mixed solvent of water and alcohol. According to another embodiment, it includes a mixed solvent of water and polyhydric alcohol. The alcohol plays a role as a scavenger since it prevents a reaction of the electrons generated from the electron beams, or the electrons or radicals generated by the water hydrate when the electron beams are collided with the water, with radicals or ions so that the electrons and radicals are separated, and then it reduces the catalyst precursor. It is preferable that polyhydric alcohol is used as the alcohol, since polyhydric alcohol can act as a dispersing agent as well so that it disperses the catalyst precursor and the entire reaction is uniformly occurred.

The water and the alcohol can be mixed in a volume ratio of 995 to 250:5 to 750. In one embodiment, the water and the alcohol can be mixed in a volume ratio of 970 to 500:30 to 500. In another embodiment, the alcohol may be mixed with water in a volume ratio of 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, or 750.

When the alcohol is added in a volume ratio of less than 5, the alcohol insufficiently acts as a scavenger, while on the other hand, when it is included in a volume ratio of more than 750, the catalyst precursor is not reduced.

According to one embodiment, the molar concentration of the catalyst precursor in the catalyst precursor solution ranges from 30 mM to 1 mM. According to another embodiment, it ranges from 20 mM to 5 mM. When the molar concentration of the catalyst precursor is more than 30 mM, the catalyst precursor is overly added so that they are aggregated to increase the particle diameter. On the other hand, when it is less than 1 mM, the solvent is overly added so that the efficiency of the electron beam energy is too deteriorated.

The alcohol is selected from the group consisting of isopropyl alcohol, methanol, ethanol, n-propyl alcohol, butanol, ethylene glycol, glycerol, and combinations thereof.

The catalyst precursor may be selected from the group consisting of $H_2PtCl_6$, $H_6Cl_2N_2Pt$, $PtCl_2$, $PtBr_2$, platinum acetylacetonate, $K_2[PtCl_4]$, $H_2Pt(OH)_6$, $Pt(NO_3)_2$, $[Pt(NH_3)_4]Cl_2$, $[Pt(NH_3)_4](HCO_3)_2$, $[Pt(NH_3)_4](OAc)_2$, $(NH_4)_2PtBr_6$, $(NH_3)_2PtCl_6$, hydrates thereof, and combinations thereof.

In addition, it may further include a transition element precursor as well as the catalyst precursor to provide a two-or-more-element alloy catalyst of platinum-transition element. According to another embodiment, it is a two-to-four-element alloy catalyst. The transition elements may include V, Cr, Mn, Fe, Co, Ni, Cu, Ru, Ir, W, Mo, or Rh. In the conventional fuel cell, the same kind of catalyst is used in both the cathode and the anode. In the embodiments of present invention, the cathode catalyst includes V, Cr, Mn, Fe, Co, Ni, or Cu as the transition elements used with platinum, and the anode catalyst includes Ru, Ir, W, Mo, or Rh as the transition elements used with platinum. The precursor may be any kind of compound such as halides, nitrates, hydrochlorides, sulfates, amines, and so on. According to another embodiment, it is a halide.

During the mixing process, a carrier may be further added. The carrier may include a carbon-based material such as graphite, denka black, ketjen black, acetylene black, carbon nanotube, carbon nano fiber, carbon nano wire, carbon nano ball, activated carbon, and so on, or an inorganic material particulate such as alumina, silica, zirconia, titania, and so on. The carbon-based material is generally used. The carrier may be added in an amount ranging from 95 to 50 parts by weight based on 100 parts by weight of the catalyst precursor when the fuel cell catalyst is for the polymer electrolyte membrane fuel cell. When it is for the direct oxidation fuel cell, it ranges from 50 to 5 parts by weight. According to another embodiment, it can be a black catalyst that does not include a carbon carrier.

In order to disperse the catalyst precursor more uniformly during the mixing process, a dispersing agent may be added. The dispersing agent is selected from the group consisting of tetrahydro furan, glycerol, ethylene glycol, and combinations thereof. The dispersing agent may be added in an amount of 10 to 60 parts by weight based on 100 parts by weight of a mixture of the catalyst precursor and the solvent. When the dispersing agent is used, it facilitates the dispersion of the catalyst precursor and the carbon carrier so that the catalyst particle diameter is diminished. When the dispersing agent is added in an amount of less than 10 parts by weight based on 100 parts by weight of a mixture of the catalyst precursor and the solvent, the catalyst particle diameter is overly increased. When it is more than 60 parts by weight, the catalyst particles are too small to be filtered so that the catalyst cannot be gained as a powder form and it is easily aggregated.

Subsequently, the mixture of the catalyst precursor and the solvent is subjected to electron beam radiation having energy of less than or equal to 1 MeV to prepare a fuel cell catalyst. In on embodiment, the electron beams have energy of 50 to 700 KeV, and in another embodiment, the electron beams have energy of 100 to 300 KeV.

For example, the electron beams have energy of 50, 60, 70, 80, 90, 100, 110, 120, 130, 140, 150, 160, 170, 180, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, or 700 KeV.

That is, the electron beams according to embodiments of the present invention have energy lower than the conventionally used energy of 2 to 10 MeV. Generally, a high energy reaction progresses faster, but the device for generating an electron beam with higher energy requires a huge space and the cost is increased. In addition, mass production is impossible since high energy releases a lot of X-rays that are environmentally restricted. Since the embodiments of the present invention uses electron beams having energy of equal to or less than 1 MeV, the conventional problems are solved. The electron beams having such a low energy can control the reaction speed to provide a catalyst with uniform catalyst particles.

In one embodiment, the electron beam irradiation is carried out with a dose rate ranging from 1 to 40kGy/min, and in another embodiment, the electron beam irradiation is carried out with a dose rate ranging from 1 to 30 kGy/min. For example, the electron beam irradiation is carried out with a dose rate of 1, 5, 10, 15, 20, 25, 30, 35, and 40 kGy/min. When the dose rate is less than 1 kGy/min, the energy of the electron beams is too weak to generate the reaction due to the prolonged reaction duration and not overcoming the activation energy. On the other hand, when it is more than 40 kGy/min, the electric current level is too high to provide a uniform catalyst and to protect the equipment.

The electron beams may be irradiated directly to a mixture of a catalyst precursor and a solvent, or indirectly through a window formed of a polymer material. When the electron beams are irradiated through the polymer window, the catalysts can be mass produced since a recently developed irradiation device can irradiate without restricting the direction. The polymer material may include polyimide (Kapton), porous polytetrafluoroethylene, or polyurethane, and the thickness thereof is between 10 and 100 μm.

The provided fuel cell catalyst is a micro particle having a diameter of 1 to 10 nm.

The catalyst according to the embodiments of the present invention may be applied to either an anode or a cathode of a fuel cell or to both of them. In the case of a general fuel cell, the same kind of catalyst is used for both the anode and the cathode, which is easily understood by a person having an ordinary skill in the art.

The electrode including the above catalyst includes an electrode substrate and a catalyst layer.

The catalyst layer includes the catalyst prepared according to the above described method.

The catalyst layer may further include a binder resin to improve adherence to the polymer electrolyte membrane and the proton transferring property.

The binder resin may be a proton conductive polymer having a cation exchange group selected from the group consisting of a sulfonic acid group, a carboxylic acid group, a phosphoric acid group, a phosphonic acid group, and derivatives thereof at its side chain. Non-limiting examples of the polymer include at least one selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

Hydrogen can be replaced with Na, K, Li, Cs, or tetrabutyl ammonium in a proton conductive group of the proton conductive polymer. When H is substituted by Na in an ion exchange group at the terminal end of the proton conductive group, NaOH is used. When H is replaced with tetrabutyl ammonium, tributyl ammonium hydroxide is used. H can also be replaced with K, Li, or Cs by using appropriate compounds. A method of substituting H is known in this related art, and therefore is not further described in detail.

The binder resin may be used singularly or as a mixture. Optionally, the binder resin may be used along with a non-conductive polymer to improve adherence between a polymer electrolyte membrane and the catalyst layer. The use amount of the binder resin may be adjusted to its usage purpose.

Non-limiting examples of the non-conductive polymer include polytetrafluoroethylene (PTFE), tetrafluoroethylene-hexafluoropropylene (FEP) copolymers, tetrafluoroethylene-perfluoro alkyl vinylether (PFA) copolymers, ethylene/tetrafluoroethylene (ETFE), ethylenechlorotrifluoro-ethylene (ECTFE) copolymers, polyvinylidene fluoride, polyvinylidene fluoride-hexafluoropropylene (PVdF-HFP) copolymers, dodecyl benzene sulfonic acid, sorbitol, and combinations thereof.

The electrode substrate supports the electrode, and provides a path for transferring a fuel and an oxidant to the catalyst. In one embodiment, the electrode substrates are formed of a material such as carbon paper, carbon cloth, carbon felt, or a metal cloth (a porous film formed of a metal fiber or a metal film disposed on a surface of a cloth formed of polymer fibers). The electrode substrate is not limited thereto.

The electrode substrates may be treated with a fluorine-based resin to be water-repellent to prevent deterioration of diffusion efficiency due to water generated during operation of the fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer (MPL) can be added between the aforementioned electrode substrate and catalyst layer to increase reactant diffusion effects. The microporous layer generally includes conductive powders with a certain particle diameter. The conductive material may include, but is not limited to, carbon powder, carbon black, acetylene black, ketjen black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The binder resin may include, but is not limited to, polytetrafluoro ethylene, polyvinylidene fluoride, polyvinyl alcohol, cellulose acetate, polyhexafluoro propylene, polyperfluoroalkylvinyl ether, polyperfluoro sulfonylfluoride alkoxy vinyl ether, and copolymers thereof. The solvent may include, but is not limited to, an alcohol such as ethanol, isopropylalcohol, n-propylalcohol, butanol, and so on, water, dimethyl acetamide, dimethyl sulfoxide, or N-methylpyrrolidone. The coating method may include, but is not limited to, screen printing, spray coating, doctor blade methods, gravure coating, dip coating, silk screening, painting, and so on, depending on the viscosity of the composition.

A membrane-electrode assembly includes an anode, a cathode, and a polymer electrolyte membrane between the cathode and the anode.

The polymer electrolyte membrane of the membrane-electrode assembly may generally include a proton conductive polymer resin. The proton conductive polymer resin may be a polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one selected from the group consisting of fluoro-based polymers, benzimidazole-based polymers, polyimide-based polymers, polyetherimide-based polymers, polyphenylene-sulfide-based polymers, polysulfone-based polymers, polyethersulfone-based polymers, polyetherketone-based polymers, polyether-etherketone-based polymers, and polyphenylquinoxaline-based polymers. In another embodiment, the proton conductive polymer is at least one selected from the group consisting of poly(perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The hydrogen in the proton conductive group of the proton conductive polymer can be substituted with Na, K, Li, Cs, or tetrabutylammonium. When the H in the ionic exchange group of the terminal end of the proton conductive polymer side is substituted with Na or tetrabutylammonium, NaOH or tetrabutylammonium hydroxide may be used, respectively. When the H is substituted with K, Li, or Cs, suitable compounds for the substitutions may be used. Since such a substitution is known to this art, a detailed description thereof is omitted.

A fuel cell system according to one embodiment includes at least one electricity generating element, a fuel supplier, and an oxidant supplier.

The electricity generating element includes a membrane-electrode assembly, and a separator (or called as a bipolar plate). The electricity generating element generates electricity through oxidation of a fuel and reduction of an oxidant.

The fuel supplier plays a role of supplying the fuel to the electricity generating element, and the oxidant supplier plays a role of supplying the oxidant, such as oxygen or air, to the electricity generating element.

According to an embodiment of the present invention, the fuel includes hydrogen or a hydrocarbon fuel in a gas or liquid form. The hydrocarbon fuel may include methanol, ethanol, propanol, butanol, or natural gas.

FIG. 1 shows a schematic structure of a fuel cell system that will be described in detail with reference to this accompanying drawing as follows. FIG. 1 illustrates a fuel cell system wherein a fuel and an oxidant are provided to the electricity generating element through pumps, but the present invention is not limited to such structures. The fuel cell system of the present invention alternatively may include a structure wherein a fuel and an oxidant are provided in a diffusion manner.

A fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3.

In addition, the fuel supplier 5 is equipped with a tank 9 that stores the fuel, and a fuel pump 11 that is connected therewith. The fuel pump 11 supplies the fuel stored in the tank 9 with a predetermined pumping power.

The oxidant supplier 7, which supplies the electricity generating element 3 with the oxidant, is equipped with at least one pump 13 for supplying the oxidant with a predetermined pumping power.

The electricity generating element 3 includes a membrane-electrode assembly 17 that oxidizes hydrogen or a fuel and reduces an oxidant, and separators 19 and 19' that are respectively positioned at opposite sides of the membrane-electrode assembly and supply hydrogen or a fuel, and the oxidant. At least one electricity generating element 3 forms a stack 15.

The following examples illustrate the present invention in more detail. However, it is understood that the present invention is not limited by these examples.

EXAMPLE 1

A $H_2PtCl_6$ catalyst precursor, a mixed solvent of water and isopropyl alcohol (940:60 volume ratio), and a carbon nanotube carrier were mixed in a reactor to provide a catalyst precursor solution having a molar concentration of 12.8 mM. The catalyst precursor solution was irradiated with electron beams having energy of 300 KeV to provide a fuel cell catalyst. The carrier was added in an amount of 20 parts by weight based on 100 parts by weight of the catalyst precursor. The electron beams were irradiated for 30 minutes with a dose rate of 2 kGy/min.

EXAMPLE 2

A fuel cell catalyst was prepared in accordance with the same procedure as in Example 1 except that electron beams having energy of 300 KeV were irradiated for 30 minutes with a dose rate of 2 kGy/min, and a black catalyst having no carbon was used in order to display the degree of reaction by a color change.

EXAMPLE 3

A fuel cell catalyst was prepared in accordance with the same procedure as in Example 2 except that electron beams having energy of 1 MeV were irradiated for 10 minutes with a dose rate of 6 kGy/min.

EXAMPLE 4

A fuel cell catalyst was prepared in accordance with the same procedure as in Example 2 except that electron beams having energy of 50 KeV were irradiated for 2 hours with a dose rate of 1 kGy/min.

COMPARATIVE EXAMPLE 1

A fuel cell catalyst was prepared in accordance with the same procedure as in Example 2 except that electron beams having energy of 2 MeV were irradiated for 9 minutes with a dose rate of 7 kGy/min.

COMPARATIVE EXAMPLE 2

Commercially available Pt black was used for a fuel cell catalyst.

Figure 2:
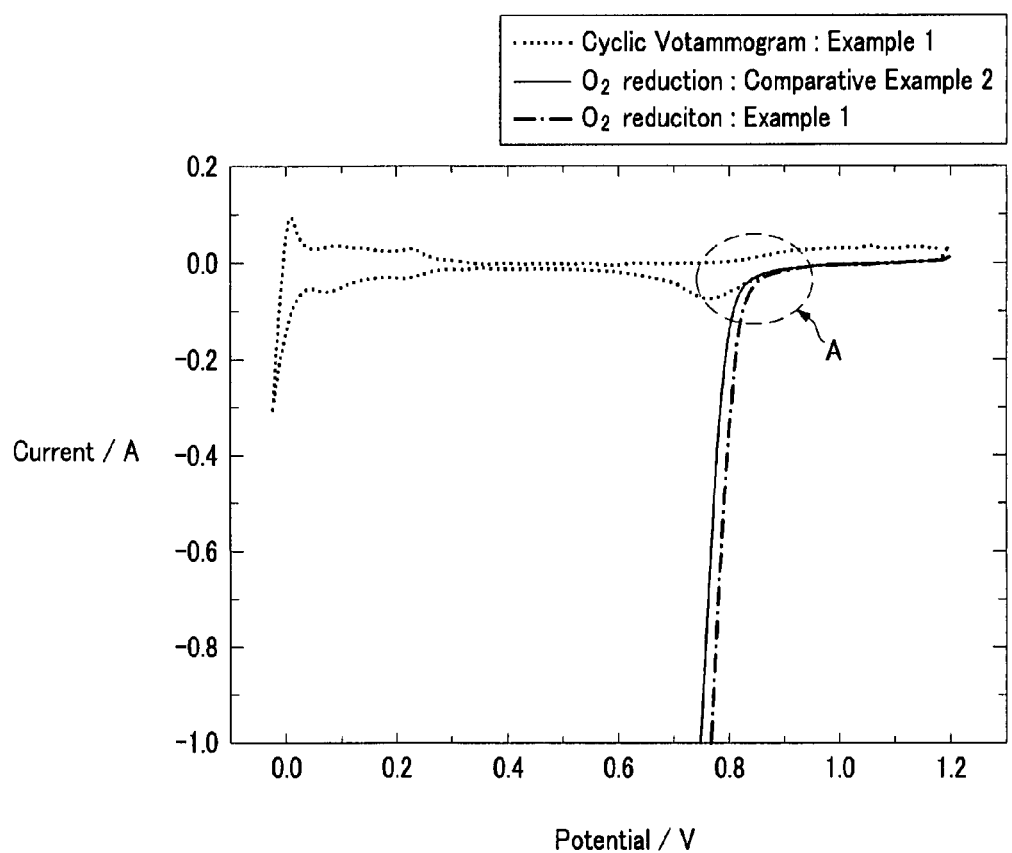
FIG. 2 shows results of performing oxygen reduction reactions of fuel cell catalysts according to Example 1 and Comparative Example 2.
Figure 3:
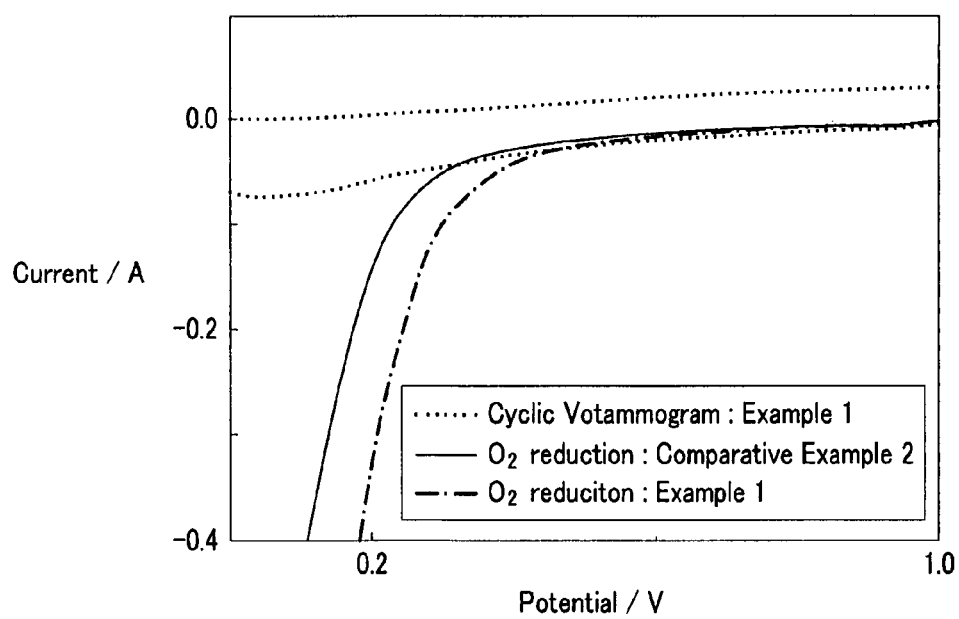
FIG. 3 is a graph showing an enlarged view of portion "A" of FIG. 2.

For the fuel cell catalysts according to Example 1 and Comparative Example 2, an oxygen reduction reaction was performed and the results are shown in FIG. 2. FIG. 3 shows an enlarged view of the portion "A" of FIG. 2. The test was carried out by a cyclic voltammogram test. The cyclic voltammogram test was carried out with the background test at 1 M condition of sulfuric acid, and bubbling oxygen. In FIG. 2 and FIG. 3, the cyclo voltammogram line indicates the results when the oxygen oxidation and reduction reaction using the catalyst according to Example 1 was performed for one cycle, while the oxygen reduction lines indicate the results when only oxygen reduction was performed. From the results shown in FIG. 2 and FIG. 3, the catalyst according to Example 1 had a higher potential than the catalyst according to Comparative Example 2. Compared with the catalyst of Comparative Example 2, the performance of the catalyst of Example 1 shows 50% improvement.

Further, tests were performed on Examples 2, 3, and 4 and Comparative Example 1 to find out the reaction degree depending upon various electron beam acceleration voltages. The degree of reaction progress was determined by a color change of the solution. The catalyst precursor solution was originally bright yellow and turned black when the platinum black catalyst was formed. The catalysts according to Examples 2 and 3 and Comparative Example 1 turned to a black color, while no color change was observed in the catalyst according to Example 4 since the acceleration energy was too little. From the results, it is estimated that the electron beams should be irradiated for a longer time to get a desirable result.

Figure 4:
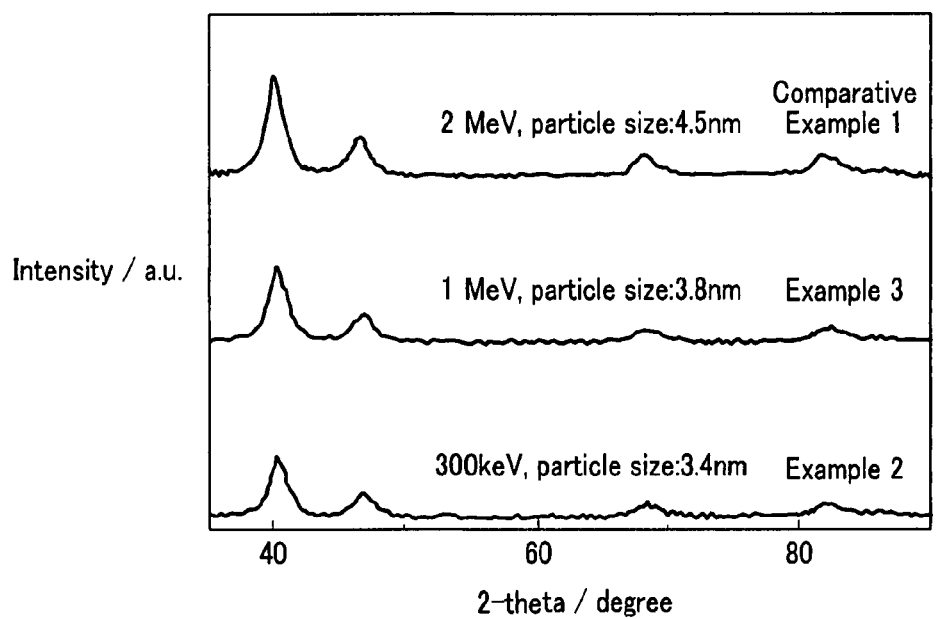
FIG. 4 is a graph showing X-ray diffraction intensity and particle diameters of catalysts according to Examples 2 and 3 and Comparative Example 1.

After observing the color change in the catalysts according to Examples 2 and 3 and Comparative Example 1, the irradiation was finished. The particle diameter was determined by monitoring the X-ray diffraction (XRD) using CuKα rays. FIG. 4 is a graph showing X-ray diffraction intensity and particle diameters. As shown in FIG. 4, even though the irradiation duration of Examples 2 and 3 was longer than that of Comparative Example 1, the catalysts according to Examples 2 and 3 can provide a higher performance fuel cell than the catalyst according to Comparative Example 1 since the provided catalyst particle diameter was smaller than that of Comparative Example 1.

A method of preparing the fuel cell catalyst of the present invention uses electron beams having low energy so that it can provide a desirable catalyst uniformly in a simple and economical process, as well as releasing relatively few X-rays so that the catalyst can be mass produced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of preparing a fuel cell catalyst, comprising:
   preparing a catalyst precursor solution by mixing a catalyst precursor and a solvent; and
   subjecting the catalyst precursor solution to radiation of electron beams having energy of less than or equal to 1 MeV to prepare the fuel cell catalyst.

2. The method of claim 1, wherein the electron beams have energy of 50 to 700 KeV.

3. The method of claim 1, wherein the electron beam irradiation is carried out with a dose rate ranging from 1 to 40 kGy/min.

4. The method of claim 1, wherein the solvent is a mixed solvent of water and alcohol.

5. The method of claim 4, wherein the alcohol is polyhydric alcohol.

6. The method of claim 4, wherein the water and the alcohol are mixed in a volume ratio of 995 to 250:5 to 750.

7. The method of claim 4, wherein the alcohol is selected from the group consisting of isopropyl alcohol, methanol, ethanol, n-propyl alcohol, butanol, ethylene glycol, glycerol, and combinations thereof.

8. The method of claim 1, wherein the molar concentration of the catalyst precursor in the catalyst precursor solution ranges from 30 mM to 1 mM.

9. The method of claim 1, wherein a carrier is further added during the mixing.

10. The method of claim 1, wherein a dispersing agent is further added during the mixing.

11. The method of claim 10, wherein the dispersing agent is selected from the group consisting of tetrahydrofuran, glycerol, ethylene glycol, and combinations thereof.

12. The method of claim 1, wherein the catalyst precursor is selected from the group consisting of $H_2PtCl_6$, $H_6Cl_2N_2Pt$, $PtCl_2$, $PtBr_2$, platinum acetylacetonate, $K_2[PtCl_4]$, $H_2Pt(OH)_6$, $Pt(NO_3)_2$, $[Pt(NH_3)_4]Cl_2$, $[Pt(NH_3)_4](HCO_3)_2$, $[Pt(NH_3)_4](OAc)_2$, $(NH_4)_2PtBr_6$, $(NH_3)_2PtCl_6$, hydrates thereof, and combinations thereof.

13. A method of preparing a fuel cell catalyst, comprising:
    preparing a catalyst precursor solution by mixing a catalyst precursor and a solvent comprising water and alcohol; and
    subjecting the catalyst precursor solution to radiation of electron beams having energy of less than or equal to 1 MeV to prepare the fuel cell catalyst.

14. The method of claim 13, wherein the electron beam irradiation is carried out with a dose rate ranging from 1 to 40 kGy/min.

15. The method of claim 13, wherein the alcohol is polyhydric alcohol.

16. The method of claim 13, wherein the water and the alcohol are mixed in a volume ratio of 995 to 250:5 to 750.

17. The method of claim 13, wherein the catalyst precursor is selected from the group consisting of $H_2PtCl_6$, $H_6Cl_2N_2Pt$, $PtCl_2$, $PtBr_2$, platinum acetylacetonate, $K_2[PtCl_4]$, $H_2Pt(OH)_6$, $Pt(NO_3)_2$, $[Pt(NH_3)_4]Cl_2$, $[Pt(NH_3)_4](HCO_3)_2$, $[Pt(NH_3)_4](OAc)_2$, $(NH_4)_2PtBr_6$, $(NH_3)_2PtCl_6$, hydrates thereof, and combinations thereof.

18. A method of preparing a fuel cell catalyst, comprising:
    preparing a catalyst precursor solution by mixing a first catalyst precursor including a platinum element, a second catalyst precursor including a transition element, and a solvent comprising water and alcohol; and
    subjecting the catalyst precursor solution to radiation of electron beams having energy of less than or equal to 1 MeV to prepare the fuel cell catalyst.

19. The method of claim 18, wherein the transition element is selected from the group consisting of V, Cr, Mn, Fe, Co, Ni, Cu, Ru, Ir, W, Mo and Rh.

20. The method of claim 18, wherein the water and the alcohol are mixed in a volume ratio of 995 to 250:5 to 750.

* * * * *